United States Patent
Ozawa et al.

(10) Patent No.: US 7,675,267 B2
(45) Date of Patent: Mar. 9, 2010

(54) CONTROL CIRCUIT OF POWER SUPPLY AND CONTROL METHOD OF THE POWER SUPPLY

(75) Inventors: Hidekiyo Ozawa, Kasugai (JP); Takashi Matsumoto, Kasugai (JP); Takahiro Yoshino, Kasugai (JP); Toru Nakamura, Kasugai (JP)

(73) Assignee: Fujitsu Microelectronics Limited, Yokohama (JP)

( * ) Notice: Subject to any disclaimer, the term of this patent is extended or adjusted under 35 U.S.C. 154(b) by 494 days.

(21) Appl. No.: 11/527,496

(22) Filed: Sep. 27, 2006

(65) Prior Publication Data

US 2007/0229036 A1    Oct. 4, 2007

(30) Foreign Application Priority Data

Mar. 30, 2006 (JP) .............................. 2006-093574

(51) Int. Cl.
*H02J 7/00* (2006.01)
(52) U.S. Cl. .......................................... 320/134; 307/66
(58) Field of Classification Search ................. 320/134, 320/138, 140; 361/90, 91.1, 91.2, 91.5; 307/66
See application file for complete search history.

(56) References Cited

U.S. PATENT DOCUMENTS

| | | | | |
|---|---|---|---|---|
| 5,923,150 | A * | 7/1999 | Umetsu | 320/162 |
| 6,201,375 | B1 * | 3/2001 | Larson et al. | 323/277 |
| 7,045,990 | B2 * | 5/2006 | Takimoto et al. | 320/134 |
| 2005/0017676 | A1 * | 1/2005 | Takimoto et al. | 320/107 |
| 2005/0099158 | A1 | 5/2005 | Matsuda | |
| 2005/0200335 | A1 | 9/2005 | Yano | |

FOREIGN PATENT DOCUMENTS

| | | |
|---|---|---|
| JP | 8-182219 A | 7/1996 |
| JP | 10-225007 A | 8/1998 |
| JP | 10-323026 A | 12/1998 |
| JP | 2000-29544 A | 1/2000 |
| JP | 2002-023771 | 1/2002 |
| JP | 2004072973 A | 3/2004 |
| JP | 2004-288537 A | 10/2004 |
| JP | 2005-12889 A | 1/2005 |
| JP | 2005-143211 | 6/2005 |
| JP | 2005-261018 | 9/2005 |
| JP | 2005-275611 A | 10/2005 |
| JP | 2005-328660 | 11/2005 |
| KR | 1998-071080 A | 10/1998 |

* cited by examiner

*Primary Examiner*—Edward Tso
*Assistant Examiner*—Ramy Ramadan
(74) *Attorney, Agent, or Firm*—Arent Fox LLP

(57) ABSTRACT

This invention aims at providing a control circuit of power supply in which a secondary battery and a device are connected in parallel, to output capable of preventing over-charging of the secondary battery and supplying power from the secondary battery to the device, and a control method of the power supply. A device 5G and a secondary battery 2G are connected to a DC-DC converter 1G in parallel. The device 5G is supplied with both a power from the DC-DC converter 1G and a power from the secondary battery 2G. When the secondary battery 2G is in non-charging state, an offset circuit 15G supplies a positive offset for reducing a difference of voltage between a detection signal Vx1G and reference voltage e1G to a reference voltage e1G corresponding to a charging inhibit signal CAS. An error amplifier ERA1G reduces an actually flowing charging current CCG by an amount corresponding to the offset value as a result of recognizing that the charging current CCG flows more by the amount corresponding to the offset value.

11 Claims, 4 Drawing Sheets

PRINCIPLE DRAWING OF THE PRESENT INVENTION

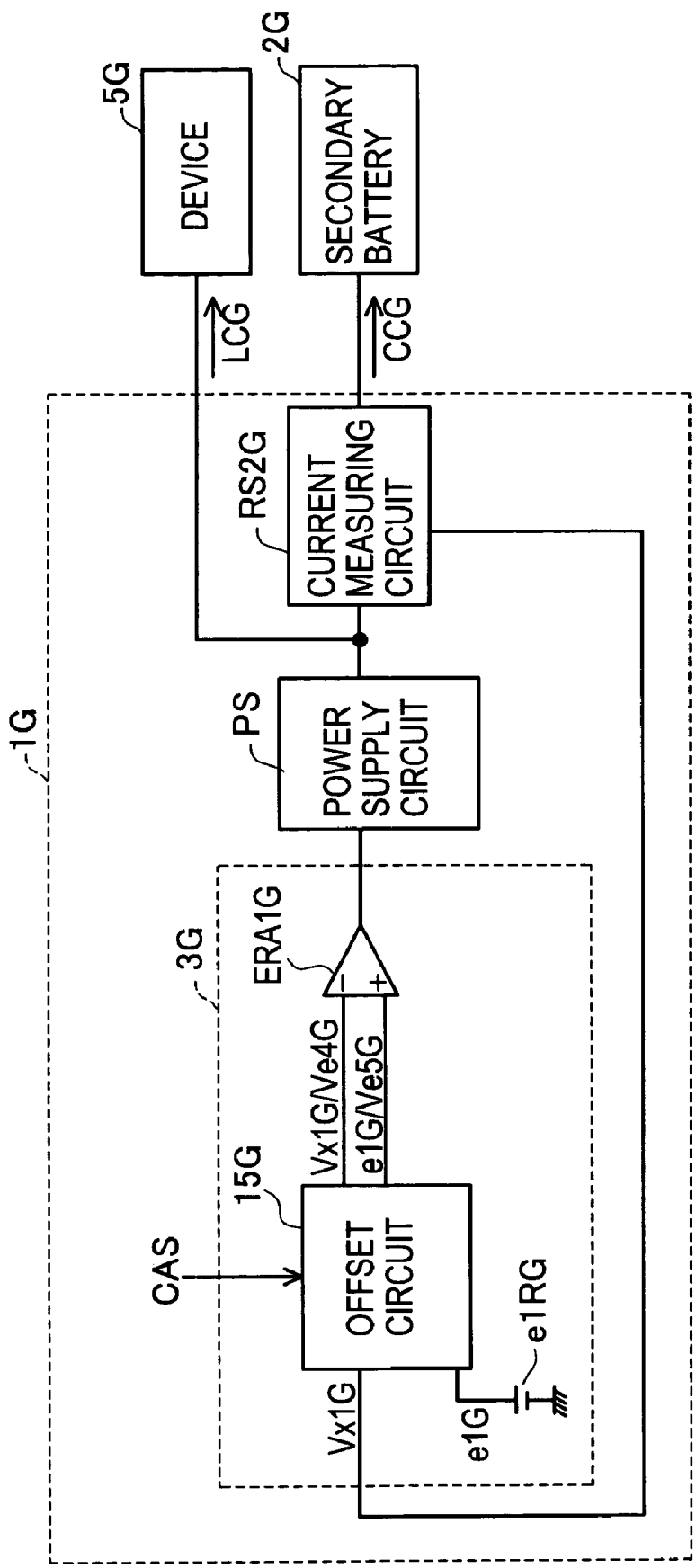
FIG.1 PRINCIPLE DRAWING OF THE PRESENT INVENTION

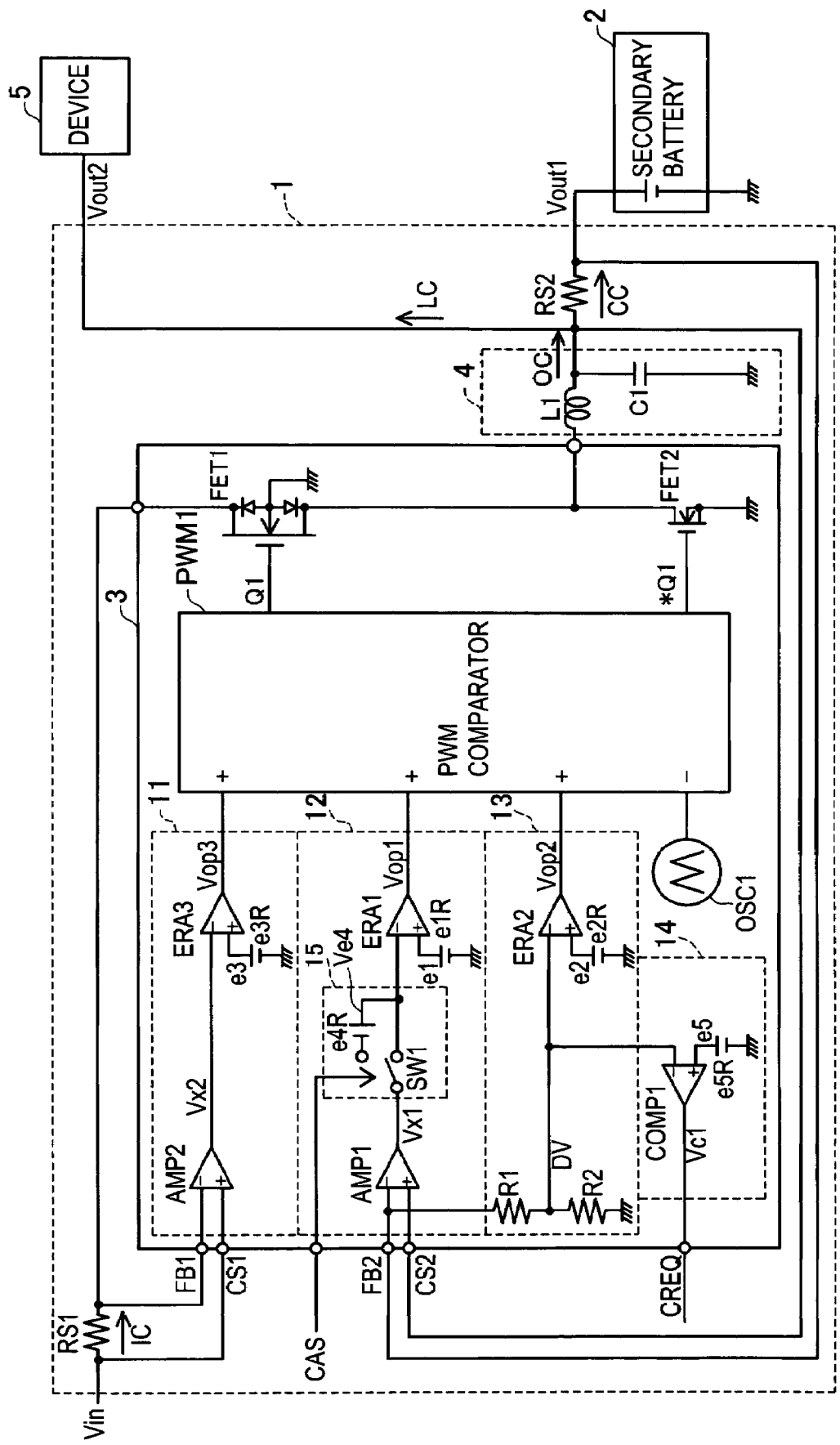
FIG.2 CIRCUIT DIAGRAM OF DC-DC CONVERTER 1 FOR CHARGER CIRCUIT

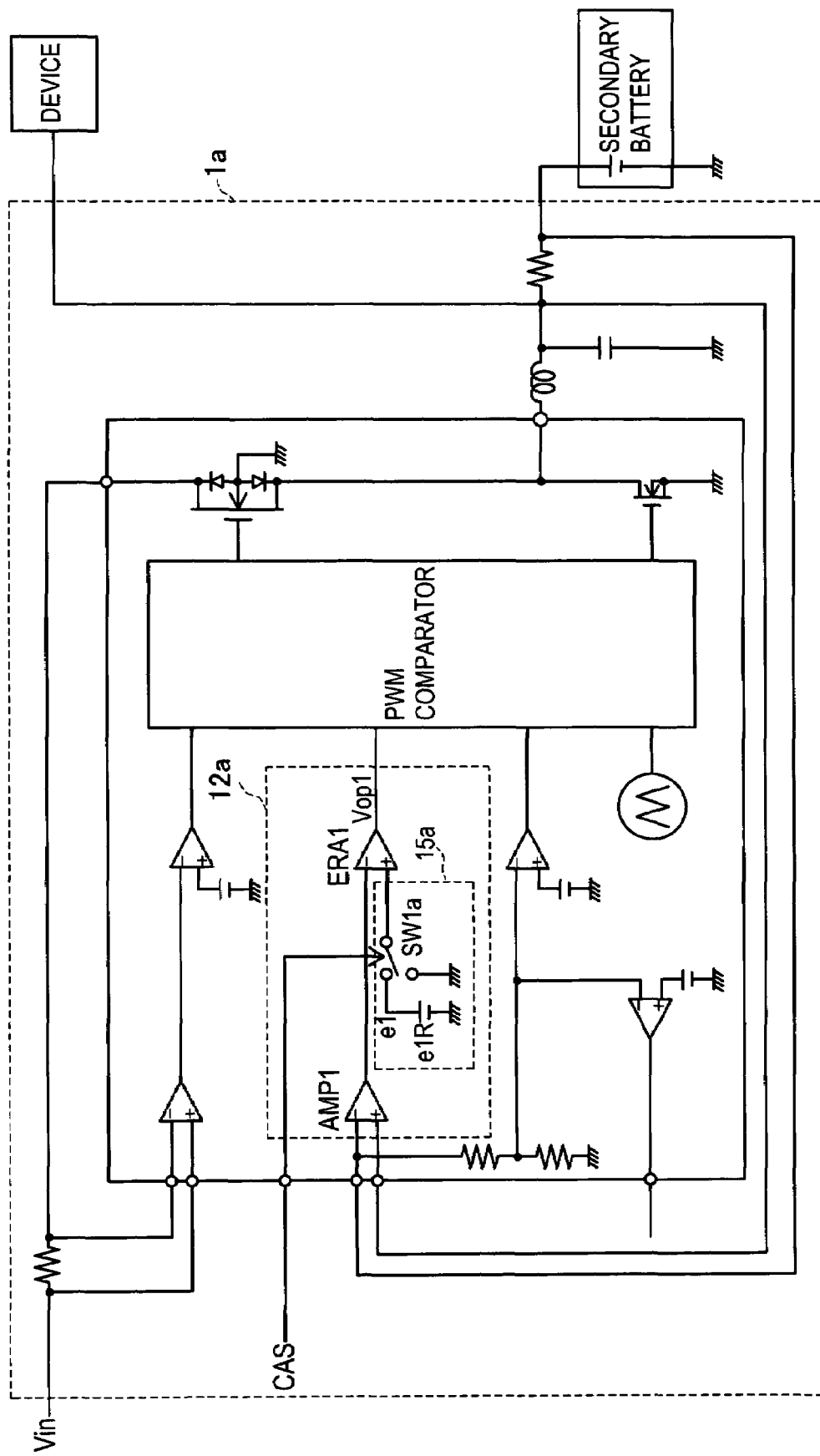
FIG.3 CIRCUIT DIAGRAM OF DC-DC CONVERTER 1a FOR CHARGER CIRCUIT

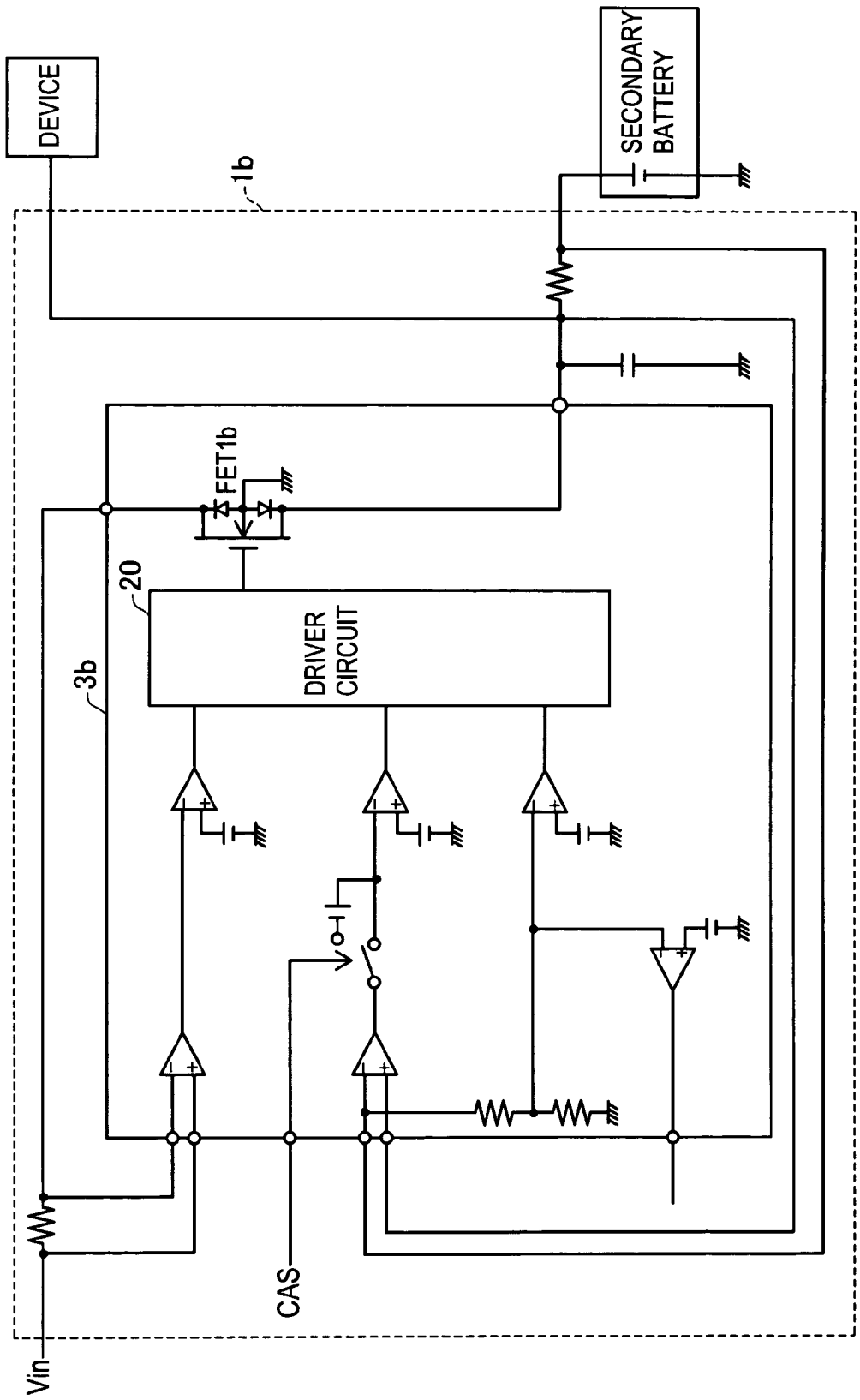
FIG.4 CIRCUIT DIAGRAM OF LINEAR REGULATOR TYPE DC-DC CONVERTER 1b

CONTROL CIRCUIT OF POWER SUPPLY AND CONTROL METHOD OF THE POWER SUPPLY

CROSS-REFERENCE TO RELATED APPLICATIONS

This application is based upon and claims the benefit of priority from the prior Japanese Patent Application No. 2006-093574 filed on Mar. 30, 2006, the entire contents of which are incorporated herein by reference.

BACKGROUND OF THE INVENTION

1. Field of the Invention

The present invention relates to a power control unit and power control method, more particularly to a power supply in which a secondary battery and a device are connected in parallel to output.

2. Description of the Related Art

Universal serial bus (USB) used as the general purpose interface for personal computer and IEEE1394 include a power supply line as well as an interface means. However, there is a limit in power supplied from a power supply line. For example, power supplied by the USB interface has a limit of current of 5V/500 mA. If a power over this limit value is requested by a device side, a protective circuit is actuated so as to shut down supply of power to the device. However, some of devices connected to the interface bus, such as a hard disk drive and DVD device, require a large consumption current transiently in a short period, for example, when its motor is started.

There exists a power supply in which a secondary battery and a device are connected in parallel to its output in order to operate the device stably. In such a power supply, when power which can be supplied from the interface bus has a margin, the secondary battery is charged by this margin of power. Then, when the power used by the device exceeds the power supply capacity of the interface bus, the shortage power is supplied to the device from the secondary battery.

As related arts, Japanese Unexamined Patent Publication Nos. 2004-288537, 2005-12889, 2005-275611, H10 (1998)-323026, 2000-29544, and H8 (1996)-182219 have been disclosed.

SUMMARY OF THE INVENTION

However, if the secondary battery and device are connected in parallel, a voltage is always applied to the secondary battery so that charging condition continues. Then, charging current flows into the secondary battery after it is charged fully also, so that over-charging condition is attained, thereby causing deterioration in performance such as shortening of the battery service life or troubles such as rupture or ignition of the secondary battery.

The present invention has been achieved to solve at least one of the above-described problems of the prior art and an object of the invention is to provide a control circuit of power supply capable of preventing over-charging of the secondary battery and supplying power from the secondary battery to a device and a control method of the power supply.

To achieve the above object, according to the present invention, there is provided a control circuit of power supply for supplying power to a secondary battery and load, comprising a charging control circuit for controlling output voltage so that charging current to the secondary battery turns to zero corresponding to a charging stop instruction of the secondary battery.

According to the present invention, there is also provided a power supply for supplying power to the secondary battery and load, comprising:

a charging control circuit for controlling the output voltage so that the charging current to the secondary battery turns to zero corresponding to a charging stop instruction of the secondary battery.

Further, according to the present invention, there is provided a control method of power supply for supplying power to the secondary battery and load, comprising:

controlling the output voltage so that the charging current to the secondary battery turns to zero corresponding to a charging stop instruction of the secondary battery.

Power is supplied from a power supply to a load and secondary battery. When the load uses a power higher than the power supply capacity of the power supply, the power for the load may be fulfilled by both a power from the power supply and a power from the secondary battery. The power supply may be used as a charger for the secondary battery or used as a power supply unit for various devices.

The charging stop instruction is an instruction signal which notifies that the secondary battery is charged fully. A charging stop instruction is dispatched by the charging amount monitor circuit of the secondary battery represented by the CPU or the like. If it is detected that the secondary battery is charged fully by the charging amount monitor circuit, the charging stop instruction notifying that matter is outputted from the charging amount monitor circuit. The charging control circuit controls the output voltage so that the charging current to the secondary battery turns to zero corresponding to the charging stop instruction. Thus, charging to the secondary battery is stopped.

If charging to the secondary battery continues even after it is charged fully, the charging current flows into the secondary battery so that it is over-charged. If the secondary battery is left in a long period after the charging is completed, the charge remainder is decreased due to self-discharge within the battery and then, the battery voltage drops, so that trickle charge occurs. Then, deterioration of performance such as shortening of the battery service life or rupture or ignition of the secondary battery may occur. However, according to the present invention, the secondary battery can be prevented from being charged further after it is charged fully by turning the charging current to the secondary battery to zero corresponding to the charging stop instruction to stop the charge control. Consequently, the over-charging of the secondary battery can be prevented thereby blocking deterioration of the secondary battery.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

BRIEF DESCRIPTION OF THE DRAWINGS

FIG. 1 is a principle drawing of the present invention;

FIG. 2 is a circuit diagram of a DC-DC converter 1;

FIG. 3 is a circuit diagram of a DC-DC converter 1a; and

FIG. 4 is a circuit diagram of a linear regulator type DC-DC converter 1b.

DETAILED DESCRIPTION OF THE PREFERRED EMBODIMENTS

FIG. 1 shows the principle drawing of the present invention. A DC-DC converter 1G comprises a control circuit 3G, a power supply circuit PS and a current measuring circuit RS2G. A control circuit 3G comprises an error amplifier ERA1G, an offset circuit 15G and a reference voltage setting portion e1RG. A charging current CCG and a load current LCG outputted from the DC-DC converter 1G are inputted to a secondary battery 2G and a device 5G respectively. A detection signal Vx1G outputted from the current measuring circuit RS2G is a signal corresponding to the charging current CCG to be charged to the secondary battery 2G. A reference voltage e1G outputted from the reference voltage setting portion e1RG is a signal for setting the limit value of the charging current CCG.

Because the device 5G and the secondary battery 2G are connected to the DC-DC converter 1G in parallel, when the device 5G uses power higher than the power supply capacity of the DC-DC converter 1G, the power which the device 5G requires can be fulfilled by both power from the DC-DC converter 1G and power from the secondary battery 2G.

An offset circuit 15G is a circuit which changes an offset value depending on whether the secondary battery 2G is in charging state or non-charging state. If the second battery 2G has not yet charged completely, it is said that the secondary battery 2G is in the charging state. On the other hand, if the secondary battery 2G has been charged fully, it is said that the secondary battery 2G is in the non-charging state.

The operation of a control circuit 3G in the charging state will be described. in the charging state, the secondary battery 2G is charged with a charging current CCG not exceeding a limit value set by the reference voltage e1G. Consequently, the load current LCG of the device 5G becomes zero, so that even if all power supplied from the DC-DC converter 1G can be supplied to the secondary battery 2G, the secondary battery 2G can be prevented from being charged with a current over the allowed capacity of the secondary battery 2G.

The operation of the control circuit 3G in the non-charging state will be described. If the charging current CCG has not reached the limit value set by the reference voltage e1G, the detection signal Vx1G is lower than the reference voltage e1G. Then, the offset circuit 15G executes an operation of providing the detection signal Vx1G or reference voltage e1G with an offset value corresponding to a charging inhibit signal.

A case where an offset value is supplied to the detection signal Vx1G by the offset circuit 15G will be described. In this case, the detection signal Vx1G is supplied with a positive offset for reducing a difference of voltage between the detection signal Vx1G and the reference voltage e1G. Then, the offset circuit 15G outputs a signal after the offset is supplied to the error amplifier ERA1G as a detection signal Ve4G. Then, the error amplifier ERA1G recognizes that the charging current CCG is flowing more by an amount corresponding to the offset value and operates to control the amount of the charging current CCG corresponding to a current limit value. As a result, the actually flowing charging current CCG can be reduced by the amount corresponding to the offset value. Then, if the offset value is set equal to the reference voltage e1G, "control for maintaining the charging current CCG below a limit value" which is carried out by the error amplifier ERA1G becomes equal to "control for maintaining the actual charging current CCG equal to or below zero", so that the charging current CCG can be turned to zero.

On the other hand, a case where the offset value is supplied to the reference voltage eG by the offset circuit 15G will be described. In this case, the reference voltage e1G is supplied with a negative offset for reducing a difference of voltage between the detection signal Vx1G and the reference voltage e1G. Then, the offset circuit 15G outputs a signal after the offset is supplied to the error amplifier ERA1G as a detection signal Ve5G. Then, the limit value of the error amplifier ERA1G drops. The error amplifier ERA1G operates to control the charging current CCG corresponding to the limit value after the drop. As a result, the charging current CCG can be reduced by an amount corresponding to the offset. If the value of the detection signal Ve5G is set to be zero, the charging current CCG can be set to zero because a control of turning the charging current CCG to zero is carried out by the error amplifier ERA1G.

Consequently, the secondary battery 2G connected in parallel to the device 5G can be prevented from being overcharged and further, when the consumption power of the device 5G becomes larger than the power supply capacity of the DC-DC converter 1G, an amount exceeding the supply capacity of the DC-DC converter 1G can be supplemented by supplying power from the secondary battery 2G to the device 5G.

The embodiment of the present invention will be described with reference to FIG. 2. FIG. 2 shows the DC-DC converter 1 for the charger of this embodiment. The DC-DC converter 1 supplies power to the device 5 and operates to charge the secondary battery 2. The input terminal of the DC-DC converter 1 is connected to a general purpose interface (USB or the like) (not shown) so as to input input-voltage Vin. The output terminal of the DC-DC converter 1 is connected to the secondary battery 2 and the device 5. Output voltages Vout1 and Vout2 are supplied to the secondary battery 2 and the device 5. The DC-DC converter 1 includes a control circuit 3, a power circuit 4 and current measuring resistors RS1, RS2. The input voltage Vin is connected to the input terminal of the current measuring resistor RS1 and the input terminal CS1 of the control circuit 3. Then, the output terminal of a current measuring resistor RS2 is connected to the input terminal of the secondary battery 2 and the input terminal FB2 of the control circuit 3.

The structure of the power circuit 4 will be described. The power circuit 4 includes a choke coil L1, and smoothing condenser C1. The output terminal of the choke coil L1 is connected to the smoothing condenser C1 located between the input terminal of a current measuring resistor RS2 and ground, the input terminal CS2 of the control circuit 3 and the device 5.

The structure of the control circuit 3 will be described. The control circuit 3 includes a transistor FET1 which is a main switching transistor, a transistor FET2 which is a synchronous rectification switch circuit, an input current monitor circuit 11, an output current monitor circuit 12, an output voltage monitor circuit 13, a charge remainder monitor circuit 14 and a PWM comparator PWM1. The transistor FET1 is a MOS transistor having a quadrupolar structure comprised of drain, drain, gate, and back gate. The output terminal of the current measuring resistor RS1 is connected to the input terminal of the transistor FET1 and the input terminal of the choke coil L1 is connected to the output terminal. Further, the non-inverting output terminal Q1 of the PWM comparator PWM1 is connected to the control terminal of the transistor FET1 so that it is turned ON/OFF by the PWM comparator PWM1. The input terminal of the transistor FET2 is grounded while its output terminal is connected to the input terminal of the choke coil L1. Further, the inverting output terminal *Q1 of the PWM comparator PWM1 is connected to the control terminal of the transistor FET2.

If the transistor FET1 is constructed in on-chip structure which forms the same LSI as the control circuit 3, the freedom of the design of the back gate terminal is intensified so that the structure for grounding the back gate can be achieved easily. Needless to say, the transistor FET1 can be constructed independently of the control circuit 3 as a discrete device which is an independent device. Likewise, needless to say, the transistor FET2 may be constructed of a discrete power device.

The input current monitor circuit 11 includes a voltage amplifier AMP2, an error amplifier ERA3 and a reference voltage setting portion e3R. An input terminal CS1 is connected to the non-inverting input terminal of the voltage amplifier AMP2 and an input terminal FB1 is connected to an inverting input terminal, so that output voltage Vx2 is outputted. The output voltage Vx2 is inputted to the inverting input of the error amplifier ERA3 and a reference voltage e3 from the ground is inputted to the non-inverting input. The output voltage Vop3 of the error amplifier ERA3 is inputted to the first non-inverting input of the PWM comparator PWM1.

The output current monitor circuit 12 includes a voltage amplifier AMP1, an error amplifier ERA1, an offset circuit 15, and a reference voltage setting portion e1R. The offset circuit 15 includes a switch circuit SW1 and an offset voltage setting portion e4R. An input terminal FB2 is connected to the inverting input terminal of the voltage amplifier AMP1 and an input terminal CS2 is connected to its non-inverting input terminal, so that output voltage Vx1 is outputted. A charging inhibit signal CAS is inputted to a switch circuit SW1 and the output terminal of the voltage amplifier AMP1 is connected to an offset voltage setting portion e4R or the non-inverting input terminal of the error amplifier ERA1.

The output voltage Vx1 or the output voltage Vx1 plus the output voltage Ve4 of the offset voltage setting portion e4R is inputted to the inverting input of the error amplifier ERA1 and the reference voltage e1 from the ground is inputted to the non-inverting input. The output voltage Vop1 of the error amplifier ERA1 is inputted to the second non-inverting input of the PWM comparator PWM1.

In FIG. 2, the charging inhibit signal CAS is a control signal which allows or inhibits the charging circuit to charge the secondary battery 2. When Low level is outputted, charging of the secondary battery 2 is allowed and when high level is outputted, charging of the secondary battery 2 is inhibited. The switch circuit SW1 is a switch circuit for changing over the charging current of the secondary battery 2 corresponding to the charging inhibit signal CAS.

The output voltage monitor circuit 13 includes an input resistor R1, a grounding resistor R2, an error amplifier ERA2 and a reference voltage setting portion e2R. The output voltage Vout1 is divided to a divided voltage DV by the circuit of an input resistor R1 and grounding resistor R2 connected in series between the input terminal FB2 and the ground and inputted to the inverting input of the error amplifier ERA2. The reference voltage e2 from the ground is inputted to the non-inverting input of the error amplifier ERA2. The output voltage Vop2 of the error amplifier ERA2 is inputted to the third non-inverting input of the PWM comparator PWM1.

The charge remainder monitor circuit 14 includes a voltage comparator COMP1 and a reference voltage setting portion e5R. The divided voltage DV is inputted to the inverting input of the voltage comparator COMP1 and the reference voltage e5 is inputted to the non-inverting input. The output voltage Vc1 outputted from the voltage comparator COMP1 is outputted from the output terminal CREQ.

The output terminal of a triangular wave oscillator OSC1 is connected to the non-inverting input terminal of the PWM comparator PWM1. The non-inverting output terminal Q1 of the PWM comparator PWM1 is connected to the control terminal of the transistor FET1 and the inverting output terminal *Q1 is connected to the control terminal of the transistor FET2.

The operation of the DC-DC converter 1 will be described. The DC-DC converter 1 is a charger which actuates the device 5 with the output voltage Vout2 and charges the secondary battery 2 with the output voltage Vout1. Then, if the consumption power of the device 5 exceeds the limit value of the input power determined by the interface bus standard such as USB, a power over the limit value can be supplied from the secondary battery 2 to the device 5.

The action of the DC-DC converter 1 is classified to two kinds, that is, an action during charging of the secondary battery 2 and an action after the charging is completed. First, the action during the charging will be described. During the charging action, a low level charging inhibit signal CAS outputted from a control circuit (CPU or the like) (not shown) is inputted to the switch circuit SW1. The switch circuit SW1 connects the output terminal of the voltage amplifier AMP1 with the inverting input of the error amplifier ERA1 corresponding to the charging inhibit signal CAS. Consequently, the secondary battery 2 is charged.

The output voltage Vout2 in the DC-DC converter 1 of FIG. 2 is given in a following expression (1).

$$Vout2 = Ton/(Ton+Toff) \times Vin \qquad \text{expression (1)}$$

Where on time Ton is a time in which the transistor FET1 is in conductive state and off time Toff is a time in which the transistor FET1 is in non-conductive state. It is evident from the expression (1) that the output voltage Vout2 can be controlled by controlling of duty cycle. Further, because the charging current CC can be controlled by the output voltage Vout2, the charging current CC can be controlled by controlling of the duty cycle.

The current flowing through the choke coil L1 is supplied from the input voltage Vin through the transistor FET1 when the transistor FET1 is on and supplied through the transistor FET2 when the transistor FET1 is off. Thus, because the average value of the input current IC is equal to a product of the average value of output current OC and on-duty of the transistor FET1, it is expressed with a following expression (2).

$$IC = Ton/(Ton+Toff) \times OC \qquad \text{expression (2)}$$

It is evident from the expression (2) that the average value of the input current IC can be controlled by controlling of the on-duty of the transistor FET1.

The PWM comparator PWM1 is a voltage comparator having three non-inverting inputs and an inverting input and compares the lowest input voltage of the output voltages Vop1 to Vop3 inputted to the three non-inverting inputs with the voltage of the inverting input. Then, this is a voltage pulse width converter which outputs a pulse when the voltage of the error amplifier inputted to the non-inverting input is higher than the triangular wave voltage inputted to the inverting input.

A case where the DC-DC converter 1 is controlled by the output current monitor circuit 12 will be described. That is, this is the case where the output voltage Vop1 is the lowest of the output voltages Vop1 to Vop3. The voltage amplifier AMP1 in the output current monitor circuit 12 is a voltage amplifier for outputting a voltage corresponding to the charging current CC by amplifying a voltage drop generated on both ends of the current measuring resistor RS2. The error amplifier ERA1 is an amplifier for outputting the output voltage Vop1 by amplifying a difference between the output voltage Vx1 of the voltage amplifier AMP1 and the reference voltage e1. Further, the PWM comparator PWM1 selects the output voltage Vop1 which is the lowest voltage of the output voltages Vop1 to Vop3 and outputs a pulse when the output voltage Vop1 is higher than the output voltage of the triangular wave oscillator OSC1. When the charging current CC (the direction of flow from the charger to the battery is assumed to be positive) flowing through the current measuring resistor RS2 increases, the output voltage Vx1 rises because the voltage drop generated on both ends of the current measuring resistor RS2 increases. Then, the difference between the output voltage Vx1 and the reference voltage e1 decreases so that the output voltage Vop1 of the error amplifier ERA1 drops. As a consequence, the output pulse width of the PWM comparator PWM1 narrows so that the on-duty of the transistor FET1 decreases thereby the output voltage Vout2 dropping. Thus, the charging current CC of the secondary battery 2 drops. Thus, the output current monitor circuit 12 can prevent the secondary battery 2 from being charged with a current exceeding the allowable current specified by the reference voltage e1.

The case where the DC-DC converter 1 is controlled by the output voltage monitor circuit 13 will be described. That is, this is the case where the output voltage Vop2 is the lowest of the output voltages Vop1 to Vop3. The error amplifier ERA2 amplifies a difference between the divided voltage DV of the output voltage Vout1 of the DC-DC converter and the reference voltage e2 and outputs the output voltage Vop2. The PWM comparator PWM1 converts the output voltage Vop2 to a pulse signal. Because the divided voltage DV rises when the output voltage Vout1 rises, the output voltage Vop2 of the error amplifier ERA2 drops. As a result, the output pulse width of the PWM comparator PWM1 narrows so that the on-duty of the transistor FET1 decreases, thereby the output voltage Vout2 dropping. Consequently, the output voltage monitor circuit 13 controls the output voltage Vout1 not to exceed the maximum voltage value at the time of charging of the secondary battery 2 specified by the reference voltage e2.

The case where the DC-DC converter 1 is controlled by the input current monitor circuit 11 will be described. That is, this is the case where the output voltage Vop3 is the lowest of the output voltages Vop1 to Vop3. The voltage amplifier AMP2 in the input current monitor circuit 11 amplifies a voltage drop generated on both ends of the current measuring resistor RS1. The error amplifier ERA3 amplifies a difference between the output voltage Vx2 of the voltage amplifier AMP2 and the reference voltage e3 and outputs the output voltage Vop3. Then, the PWM comparator PWM1 outputs a pulse having a pulse width corresponding to the magnitude of the output voltage Vop3.

If the output current OC increases, the input current IC flowing through the current measuring resistor RS1 increases according to the expression (2). Because the voltage drop generated on the both ends of the current measuring resistor RS1 increases with an increase of the input current IC, the output voltage Vx2 rises. Then, the difference between the output voltage Vx2 and the reference voltage e3 decreases thereby the output voltage Vop3 of the error amplifier ERA3 dropping. Consequently, the output pulse width of the PWM comparator PWM1 narrows so that the on-duty of the transistor FET1 decreases thereby the output voltage Vout2 dropping. Then, because the output current OC drops, the input current IC drops according to the expression (2). As a consequence, the input current monitor circuit 11 can control the input current IC not to exceed the maximum current value (500 (mA)) specified by the reference voltage e3 by controlling the input current IC by controlling the output current OC.

As described above, in the input current monitor circuit 11, when the consumption current of the device 5 increases, the charging current of the secondary battery 2 decreases and if the consumption current of the device 5 decreases, the charging current of the secondary battery 2 increases. As a result, the charging current CC of the secondary battery 2 is controlled so that the power form an external power source such as USB does not exceed its supply capacity. Further, even if the load current LC of the device 5 becomes zero so that all power supplied from outside can be supplied to the secondary battery 2, the output current monitor circuit 12 can prevent the secondary battery from being charged with a current exceeding the allowable capacity of the secondary battery 2. Therefore, the charging current CC of the secondary battery 2 is controlled to a smaller value of the value obtained by subtracting the current required by the device 5 from the maximum current (500 mA) which can be supplied from the USB interface and the maximum current value which the secondary battery can allow. Further, the output voltage Vout1 is controlled not to exceed the maximum voltage value at the time of charging the secondary battery 2 by the output voltage monitor circuit 13. Thus, the DC-DC converter 1 is actuated to stick to all respective limitation values such as the input current IC, the charging current CC and Vout1. As a consequence, charging with a specified voltage/specified current is enabled thereby preventing deterioration of the performance of the secondary battery 2. Further, if the consumption power of the device 5 exceeds the limit value of an input power specified by the interface bus standard such as the USB, a power exceeding the limit value can be supplied from the secondary battery 2 to the device 5.

Next, the action when the charging of the secondary battery is completed will be described. When it is detected that the secondary battery 2 is charged fully by a control circuit (CPU or the like) (not shown), a charging inhibit signal CAS of high level for inhibiting the charging of the secondary battery 2 is outputted from the control circuit and inputted to the control circuit 3. If the charging inhibit signal CAS of high level is inputted, the switch circuit SW1 connects the output terminal of the voltage amplifier AMP1 with the offset voltage setting portion e4R. Then, the value of the output voltage Ve4 outputted from the offset voltage setting portion e4R turns to the output voltage Vx1 of the voltage amplifier AMP1 plus the offset voltage e4. As a consequence, the error amplifier ERA1 recognizes that the charging current CC flows more by an amount corresponding to the offset voltage e4 in a positive direction and controls the charging current CC corresponding to the reference voltage e1. As a result, the amount of the actual charging current CC can be reduced by the amount corresponding to the offset.

If the value of the offset voltage e4 is equalized with the value of the reference voltage e1, it comes that the charging current CC recognized to flow more by the amount corresponding to the current specified by the reference voltage e1 is controlled to be equal to or below the current value specified by the reference voltage e1. Then, this is equivalent to controlling the actual charging current CC to be equal to or below zero. Consequently, when the secondary battery 2 is in the non-charging state, the charging current CC can be controlled to be equal to or below zero.

If the value of the offset voltage e4 is larger than the reference voltage e1, it comes that the charging current CC flowing more than the current specified by the reference voltage e1 is controlled to a current value specified by the reference voltage e1. Then, this is equivalent to controlling the actual charging current CC to a negative value (direction in which current flows out from the secondary battery 2). That is, an action for controlling the charging current CC to a negative constant current is carried out. Because no charging of the secondary battery 2 occurs, the over-charging of the secondary battery 2 can be prevented.

The operation of the charge remainder monitor circuit 14 will be described. If the secondary battery 2 is left in a long period after its charging is completed, the charge remainder decreases due to self-discharge within the battery so that the battery voltage drops. Because the DC-DC converter 1 controls the charging current CC to be equal to or below zero, the output voltage Vout2 drops with a drop in the output voltage Vout1 due to decrease in the charge remainder of the secondary battery 2. Then, because the secondary battery 2 is not charged even if the charge remainder of the secondary battery 2 decreases, the voltage of the secondary battery 2 after the charging is completed cannot be prevented from dropping. Thus, the charge remainder monitor circuit 14 is necessary.

The charge remainder monitor circuit 14 is a circuit which is actuated when a predetermined period passes after the charging is completed. The voltage comparator COMP1 of the charge remainder monitor circuit 14 outputs output voltage Vc1 of low level to the output terminal CREQ when the divided voltage DV of the output voltage Vout1 is higher than the reference voltage e5 and outputs output voltage Vc1 of high level to the output terminal CREQ when the divided voltage DV is lower than the reference voltage e5. That is, the charge remainder monitor circuit 14 can notify that the remainder of the secondary battery 2 decreases with respect to a predetermined value to a control circuit (not shown) with the output voltage Vc1 by monitoring the output voltage Vout1. After receiving the notification, the control circuit outputs the charge inhibit signal CAS of low level notifying that the charging of the secondary battery 2 is started corresponding to a decrease in the remainder of the secondary battery 2. Then, the DC-DC converter 1 starts charging of the secondary battery 2 corresponding to the charge inhibit signal CAS of low level. Consequently, the voltage of the secondary battery 2 can be prevented from dropping.

The transistor FET1 of this embodiment will be described. The transistor FET1 is a MOSFET having quadrupolar structure including drain, drain, gate and back gate and the back gate is grounded.

Conventionally, as a power transistor for large power, N type DMOS or P type DMOS transistor has been used. These transistors have a characteristic that current flows in the vertical direction of the section (bulk direction) of its device. However, because the N type DMOS includes a parasitic diode in the direction from a source to a drain and the P type DMOS includes a parasitic diode in the direction from the drain to the source, the switching action occurs in only a single direction. Consequently, when supply of power from the interface bus is interrupted with the interface bus of a personal computer or the like physically connected to the DC-DC converter 1, current leakage is generated from the secondary battery 2 to the interface bus through the parasitic diode of a main transistor, which is a problem to be solved. Thus, conventionally, it is necessary to connect the DMOS transistors in series in opposite directions to each other or insert a diode in order to prevent leakage of current, thereby increasing the size of the circuit or quantity of required components, which is another problem to be solved.

However, the DC-DC converter 1 of this embodiment uses a N type MOSFET transistor FET1 which includes quadrupolar structure including drain, drain, gate and back gate while the back gate is grounded, as a power transistor. The transistor FET1 has a characteristic that current flows in the lateral direction of the section of the device. Thus, two parasitic diodes can be formed between the drain and drain by grounding the back gate. Accordingly, generation of current leakage can be prevented with only the transistor FET1 without using any transistor or diode, thereby leading to reduction in size of the circuit and quantity of required components.

As described in detail above, the DC-DC converter 1 of this embodiment is capable of charging the secondary battery 2 with constant voltage and constant current when it is in the charging state and controlling the charging state so that the charging current CC turns equal to or below zero when it is in the non-charging state. Thus, the charger in which the secondary battery 2 and the device 5 are connected in parallel can prevent over-charging of the secondary battery 2, thereby preventing the secondary battery 2 from being deteriorated. Then, when the consumption power of the device 5 turns to a value exceeding the power supply capacity of the DC-DC converter 1, power can be supplied to the device 5 from the secondary battery 2 connected in parallel to the device 5.

Further, when the output voltage Vout1 is monitored by the charge remainder monitor circuit 14, drop of the battery voltage due to self-discharge of the secondary battery 2 can be detected. Thus, the voltage of the secondary battery can be prevented from dropping.

As the main switching transistor, the transistor FET1 which is a MOSFET having the quadrupolar structure including drain, drain, gate and back gate while the back gate is grounded is used. Two parasitic diodes in opposite directions can be formed between the drain and drain by grounding the back gate. Because consequently, the current leakage can be prevented, leakage of current from the secondary battery 2 to an external power source can be prevented without using any transistor or diode.

The present invention is not restricted to the above-described embodiments but needless to say, the invention may be improved or modified in various ways within a range not departing from the gist of the invention. Although the offset circuit 15 of FIG. 2 controls the charging current CC to be equal to or below zero by applying the offset voltage e4 to the output voltage Vx1 of the voltage amplifier AMP1, the present invention is not restricted to this example. It is permissible to supply the reference voltage e1 with an offset like the output current monitor circuit 12a provided on the DC-DC converter 1a shown in FIG. 3.

The output current monitor circuit 12a is provided with the offset circuit 15a instead of the offset circuit 15 of FIG. 2. The switch circuit SW1a provided on the offset circuit 15a selects grounding potential or reference voltage setting portion e1R corresponding to the charging inhibit signal CAS and inputs to the non-inverting input terminal of the error amplifier ERA1.

When the secondary battery 2 is in the charging state, the charging inhibit signal CAS of low level notifying that charging of the secondary battery 2 is allowed is inputted to the switch circuit SW1a. The switch circuit SW1a connects the reference voltage setting portion e1R with the non-inverting input of the error amplifier ERA1 corresponding to the charging inhibit signal CAS. Thus, the limit value of the charging current CC varies depending on the reference voltage e1.

On the other hand, when the secondary battery 2 is in the non-charging state, the charging inhibit signal CAS notifying that the charging of the secondary battery is inhibited is inputted to the switch circuit SW1a. The switch circuit SW1a connects the grounding potential with the non-inverting input of the error amplifier ERA1 corresponding to the charging inhibit signal CAS. Then, because the limit value of the charging current CC turns to zero, the error amplifier ERA1 controls the charging current CC to be equal to or below zero. Consequently, the charging current CC can be controlled to be equal or below zero by using the offset circuit 15a when the secondary battery 2 is in the non-charging state.

Although according to this embodiment, the DC-DC converter 1 shown in FIG. 2 is a switching type DC-DC converter, the present invention is not restricted to this example. Needless to say, as shown in FIG. 4, this may be a linear regulator type DC-DC converter 1b including a control circuit 3b having a driver circuit 20.

In this embodiment, the voltage mode type DC-DC converter has been described. The point of the present invention here exists in controlling the charging current CC to be equal to or below zero when the secondary battery 2 is in the non-charging state. More specifically, this embodiment has a feature in that the offset circuit 15 changes over the offset value corresponding to the charging state. Thus, needless to say, the present invention can be applied to the current mode type DC-DC converter as well as the voltage mode type one.

Although the case of supplying the offset voltage to the output voltage Vx1 (FIG. 2) and the case of supplying the offset voltage to the reference voltage e1 (FIG. 3) have been described separately, the present invention is not restricted to this example. Needless to say, it is permissible to supply the offset to both the output voltage Vx1 and the reference voltage e1.

The control circuit 3 of this embodiment may be constructed of a single or plural semiconductor chips. Further, the DC-DC converter 1 may be constituted of a single or plural semiconductor chips. The DC-DC converter 1 and the control circuit 3 may be constituted as a module. Further, the DC-DC converter 1 may be constructed as a power supply having auxiliary power. In this case, the secondary battery 2 is provided on the DC-DC converter 1. The secondary battery 2 is charged as required. Further, the DC-DC converter 1 may be used as a charger. In this case, the secondary battery 2 is provided on the device 5.

In the meantime, the charging inhibit signal CAS is an example of a charging stop instruction, the error amplifier ERA1 is an example of a first error amplifier, the output voltage Vx1 is an example of the detection signal and the reference voltage e1 is an example of the reference signal.

The control circuit of the power supply, the power supply and the control method of the power supply can prevent the over-charging of the secondary battery and if the consumption power of the device exceeds the power supply capacity of the power supply, enable power to be supplied from the secondary battery to the device.

What is claimed is:

1. A control circuit of a power supply for supplying power to a secondary battery and a load, comprising:
   an offset circuit for supplying an offset value with a detection signal corresponding to a charging current to the secondary battery or a reference signal for setting a current value of the charging current to a given value, and determining whether or not to supply the offset value based on a charging stop instruction of the secondary battery; and
   a charging control circuit for controlling an output voltage so that the charging current to the secondary battery decreases to a value corresponding to the offset value.

2. The control circuit of the power supply according to claim 1,
   wherein the charging control circuit comprises a first error amplifier for amplifying a difference between the detection signal corresponding to the charging current and the reference signal for setting the given value of the charging current, and
   wherein the offset value is a value for reducing the difference which indicates that a current value of the charging current has not reached the given value.

3. The control circuit of the power supply according to claim 2,
   wherein the offset circuit comprises:
   an offset generating circuit for generating the offset value that increases an absolute value of a voltage value of the detection signal; and
   a first selector circuit for adding the offset value to the detection signal in response to the charging stop instruction, the first selector circuit being provided on a transmission path of the detection signal.

4. The control circuit of the power supply according to claim 3, wherein the offset value is a value greater than a value of the reference signal.

5. The control circuit of the power supply according to claim 2,
   wherein the offset circuit comprises:
   a reference signal generating circuit for generating the reference signal; and
   a second selector circuit for outputting the reference signal when the charging stop instruction is not dispatched and further outputting a grounding voltage in response to the charging stop instruction, the second selector circuit being provided on a transmission path of the reference signal, and
   wherein an absolute value of a voltage value of the grounding voltage is smaller than an absolute value of a voltage value of the reference voltage.

6. The control circuit of the power supply according to claim 1 further comprising a comparator for, when the secondary battery is in a non-charging state, comparing the output voltage of the secondary battery with a predetermined setting voltage.

7. The control circuit of the power supply according to claim 1, wherein the load and the secondary battery are connected in parallel to the power supply.

8. The control circuit of the power supply according to claim 1 further comprising an output transistor constituted of a MOS transistor having quadrupolar structure with its back gate connected to grounding voltage.

9. A power supply for supplying power to a secondary battery and a load, comprising:
   an offset circuit for supplying an offset value with a detection signal corresponding to a charging current to the secondary battery or a reference signal for setting a current value of the charging current to a given value, and determining whether or not to supply the offset value based on a charging stop instruction of the secondary battery; and
   a charging control circuit for controlling an output voltage so that the charging current to the secondary battery decreases to a value corresponding to the offset value.

10. A control method of a power supply for supplying power to a secondary battery and a load comprising:

supplying an offset value with a detection signal corresponding to a charging current to the secondary battery or a reference signal for setting a current value of the charging current to a given value;

determining whether or not to supply the offset value based on a charging stop instruction of the secondary battery; and controlling an output voltage so that the charging current to the secondary battery decreases to a value corresponding to the offset value.

11. The control method of the power supply according to claim 10 further comprising:

amplifying a difference between the detection signal corresponding to the charging current and the reference signal for setting the given value of the charging current, wherein the offset value is a value for reducing the difference which indicates that a current value of the charging current has not reached the given value.

* * * * *